US008839597B2

(12) United States Patent
Babini et al.

(10) Patent No.: US 8,839,597 B2
(45) Date of Patent: Sep. 23, 2014

(54) SEALING ELEMENT FOR HEAT SEALING PACKAGING MATERIAL FOR PRODUCING SEALED PACKAGES OF FOOD PRODUCTS POURABLE WITHIN A TUBE OF PACKAGING MATERIAL

(75) Inventors: Andrea Babini, Modena (IT); Roland Palmquist, Åkarp (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 592 days.

(21) Appl. No.: 13/254,133

(22) PCT Filed: Mar. 29, 2010

(86) PCT No.: PCT/EP2010/054081
§ 371 (c)(1),
(2), (4) Date: Aug. 31, 2011

(87) PCT Pub. No.: WO2010/112454
PCT Pub. Date: Oct. 7, 2010

(65) Prior Publication Data
US 2011/0308200 A1     Dec. 22, 2011

(30) Foreign Application Priority Data
Mar. 30, 2009   (EP) .................... 09156765

(51) Int. Cl.
| B65B 7/00 | (2006.01) |
| B29C 65/00 | (2006.01) |
| B29C 65/74 | (2006.01) |
| B65B 9/20 | (2012.01) |
| B29C 65/36 | (2006.01) |
| B65B 51/30 | (2006.01) |
| B29C 65/08 | (2006.01) |
| B29K 711/12 | (2006.01) |
| B29L 9/00 | (2006.01) |
| B29C 65/18 | (2006.01) |
| B29K 305/02 | (2006.01) |
| B29K 23/00 | (2006.01) |

(52) U.S. Cl.
CPC .............. *B65B 51/306* (2013.01); *B29C 65/08* (2013.01); *B29C 66/4312* (2013.01); *B29C 66/8491* (2013.01); *B29K 2711/123* (2013.01); *B29C 65/7451* (2013.01); *B29C 66/232* (2013.01); *B29L 2009/003* (2013.01); *B29C 66/72321* (2013.01); *B29K 2995/0069* (2013.01); *B29C 66/80* (2013.01); *B65B 9/2049* (2013.01); *B29C 66/1122* (2013.01); *B29C 65/18* (2013.01); *B29C 65/368* (2013.01); *B29K 2995/0067* (2013.01); *B29C 65/3656* (2013.01); *B29C 65/3644* (2013.01); *B29K 2305/02* (2013.01); *B29K 2023/086* (2013.01); *B29K 2023/06* (2013.01); *B29C 65/3668* (2013.01)
USPC .......................... 53/551; 53/374.6; 53/375.9

(58) Field of Classification Search
USPC .......... 53/373.7, 374.6, 375.9, 451, 477, 548, 53/550, 551, 552, 563; 156/272.2, 273.7, 156/274.2, 380.1, 380.2, 380.4; 219/656, 219/672, 676, 603, 604
See application file for complete search history.

(56) References Cited

U.S. PATENT DOCUMENTS

| 4,630,429 A | 12/1986 | Christine |
| 5,678,392 A | 10/1997 | Konno |
| 6,216,420 B1 * | 4/2001 | Mazzetto et al. ............ 53/373.7 |
| 6,725,634 B1 * | 4/2004 | Palmqvist et al. ............. 53/548 |
| 7,059,100 B2 * | 6/2006 | Babini et al. ................. 53/376.2 |
| 2003/0046906 A1 * | 3/2003 | Kume et al. ..................... 53/477 |
| 2008/0092492 A1 * | 4/2008 | Konno ............................. 53/477 |
| 2008/0289303 A1 | 11/2008 | Nemkov et al. |
| 2011/0140365 A1 * | 6/2011 | Dietle et al. .................. 277/336 |

FOREIGN PATENT DOCUMENTS

| EP | 0 706 945 A1 | 4/1996 |
| RU | 2007 120 820 A | 12/2008 |
| WO | 2006/048441 A1 | 5/2006 |

OTHER PUBLICATIONS

International Search Report (PCT/ISA/210) issued on May 7, 2010, by European Patent Office as the International Searching Authority for International Application No. PCT/EP2010/054081.

Written Opinion (PCT/ISA/237) issued on May 7, 2010, by European Patent Office as the International Searching Authority for International Application No. PCT/EP2010/054081.

\* cited by examiner

*Primary Examiner* — Hemant M Desai

(74) *Attorney, Agent, or Firm* — Buchanan Ingersoll & Rooney PC

(57) ABSTRACT

A sealing element for heat sealing packaging material for producing sealed packages of food products which are pourable within a tube of packaging material; sealing element comprises a heater adapted to heat-seal the packaging material at spaced cross sections of tube so as to form a plurality of sealed packages, and a groove which may be engaged by a cutting element carried by a counter sealing element during a cutting operation in which a sealed package is separated from tube; sealing element comprises at least a slot which extends between groove and a first outer wall of sealing element.

8 Claims, 3 Drawing Sheets

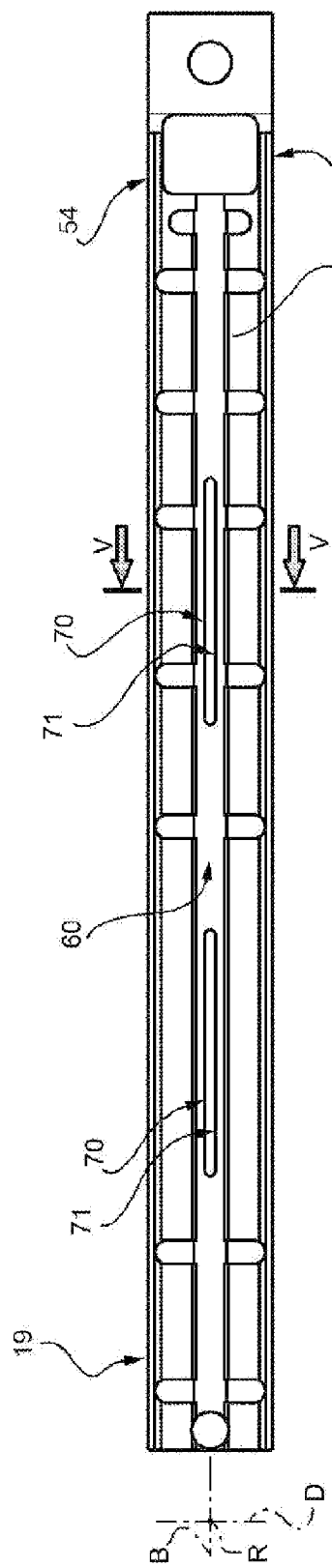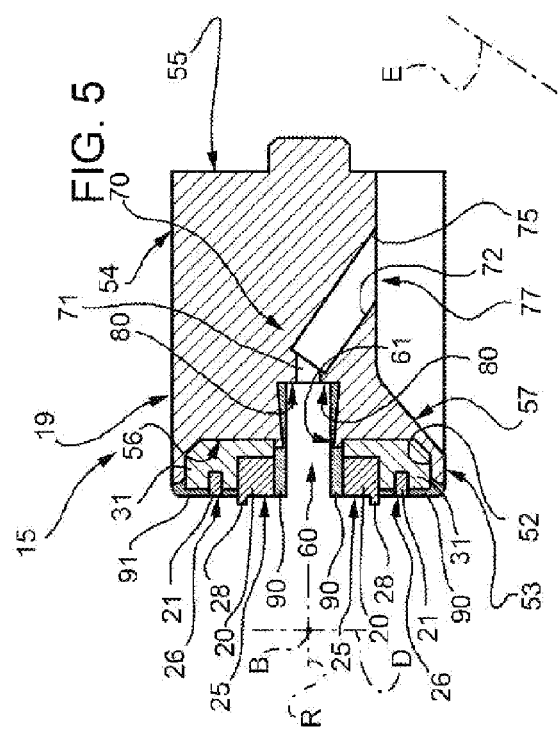

SEALING ELEMENT FOR HEAT SEALING PACKAGING MATERIAL FOR PRODUCING SEALED PACKAGES OF FOOD PRODUCTS POURABLE WITHIN A TUBE OF PACKAGING MATERIAL

This patent application is a U.S. National Phase of International Patent Application No. PCT/EP2010/054081, filed 29 Mar. 2010, which claims priority to European Patent Office No. 091567651, filed 30 Mar. 2009, the disclosures of which are incorporated herein by reference in their entirety.

TECHNICAL FIELD

The present invention relates to a sealing element for heat sealing packaging material for producing sealed packages of food product pourable within a tube of packaging material.

BACKGROUND ART

Many food products, such as fruit juice, pasteurized or UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may be defined by a layer of fibrous material, e.g. paper, or mineral-filled polypropylene material; and a number of layers of heat-seal plastic material, e.g. polyethylene film, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH) film, which is superimposed on a layer of heat-seal plastic material, and is in turn covered with another layer of heat-seal plastic material forming the inner face of the package eventually contacting the food product.

As is known, packages of this sort are produced on fully automatic packaging units, on which a continuous tube is formed from the web-fed packaging material; the web of packaging material is sterilized in the packaging unit, e.g. by applying a chemical sterilizing agent such as a hydrogen peroxide solution, which is subsequently removed, e.g. by heating and evaporation, from the surfaces of the packaging material.

The sterilized web is maintained in a closed, sterile environment, and is folded into a cylinder and sealed longitudinally to form a tube.

The tube is fed in a first vertical direction parallel to its axis, is filled continuously with the sterilized or sterile-processed food product and is heat-sealed at equally spaced cross sections by two pairs of jaws to form pillow packages each having a top and a bottom transverse sealing band, i.e. a band extending along a second direction orthogonal to the first direction.

The tube portion gripped between each pair of jaws is heat sealed by heating means carried by one of the jaws, known as the sealing jaw, and which locally melt the two layers of heat-seal plastic material gripped between the jaws.

For example, packaging material in which the layer of barrier material comprises a sheet of electrically conductive material, e.g. aluminium, is normally heat sealed by a so-called induction heat-sealing process, in which, when the tube is gripped by the two jaws, loss current is induced in, and locally heats, the aluminium sheet, thus melting the heat-seal plastic material locally.

In particular, in induction heat sealing, the heating means substantially comprise an inductor powered by a high-frequency current generator and substantially comprising, in turn, one or more inductor bars made of electrically conductive material, extending parallel to the second direction, and which interact with the tube material to induce a loss current in it and heat it to the necessary sealing temperature.

The heating means are fitted to a sealing element carried by the sealing jaw.

The other jaw, known as the counter-jaw, comprises a counter-sealing element fitted with pressure pads made of elastomeric material, and which cooperate with the inductor bars to heat seal the tube along a relative transverse sealing band.

Furthermore, the counter-jaw houses in sliding manner a cutting element. In particular, the cutting element may slide towards and away from the sealing element of the sealing jaw along a third direction orthogonal to first and second direction.

More precisely, the cutting element is normally maintained in a withdrawn rest position within the counter-sealing element, and is moved into a forward cutting position, in which it projects frontwards from the counter-jaw, engages a blind groove of the sealing element, and cuts along the centreline of the top sealing band of the formed package. In this way, the formed package is separated from the tube.

A need is felt within the industry to avoid the accumulation of residues within the groove of the sealing element. In fact, as it is housed within the groove, the cutting element exerts a force on such residues resulting in the deformation of sealing element of sealing jaw. As a consequence, the life-time of the sealing element of the sealing jaw may be considerably reduced and there could be some risks of damaging the cutting element and/or sealing element, especially in case that sealing element is metallic.

The residues may typically consist of portions of packaging material, in particular paper mixed with polyethylene.

In particular, the aforementioned need is particularly felt when a plurality of opening devices is pre-applied to the tube of packaging material before the heat-sealing of packages and, during the heat-sealing of each package, the relative opening device is housed within a recess arranged in the sealing element of the sealing jaw.

In fact, during the starting cycles of the packaging units, the packaging material may be in an incorrect position with respect to the jaws, when cross sections of tube are heat sealed.

In this case, the opening devices, instead of being housed within the groove of the sealing element may remain, at least partially, along the trajectory of cutting element between the withdrawn rest and the forward cutting position.

In this way, some plastic residues of the opening device may be cut away by cutting element and accumulate into the groove.

As a consequence, even when packaging material has been automatically arranged in the correct position with respect to the jaw, the presence of plastic residues within groove may generate risks of deformation and/or damages of the sealing element of the sealing jaw and/or cutting element.

DISCLOSURE OF INVENTION

It is an object of the present invention to provide a sealing element for heat sealing packaging material for producing sealed packages of food products pourable within a tube of packaging material, designed to meet the above requirement in a straightforward, low-cost manner.

According to the present invention, there is provided a sealing element for heat-sealing packaging material for producing sealed packages of food products pourable within a tube of packaging material, as claimed in claim 1.

BRIEF DESCRIPTION OF THE DRAWINGS

A preferred, non-limiting embodiment of the present invention will be described by way of example with reference to the accompanying drawings, in which:

FIG. 4 is a top view, with parts removed for clarity, of the sealing element of FIGS. 2 and 3; and FIG. 5 is a section along line V-V of FIG. 4.

BEST MODE FOR CARRYING OUT THE INVENTION

Figure 1:
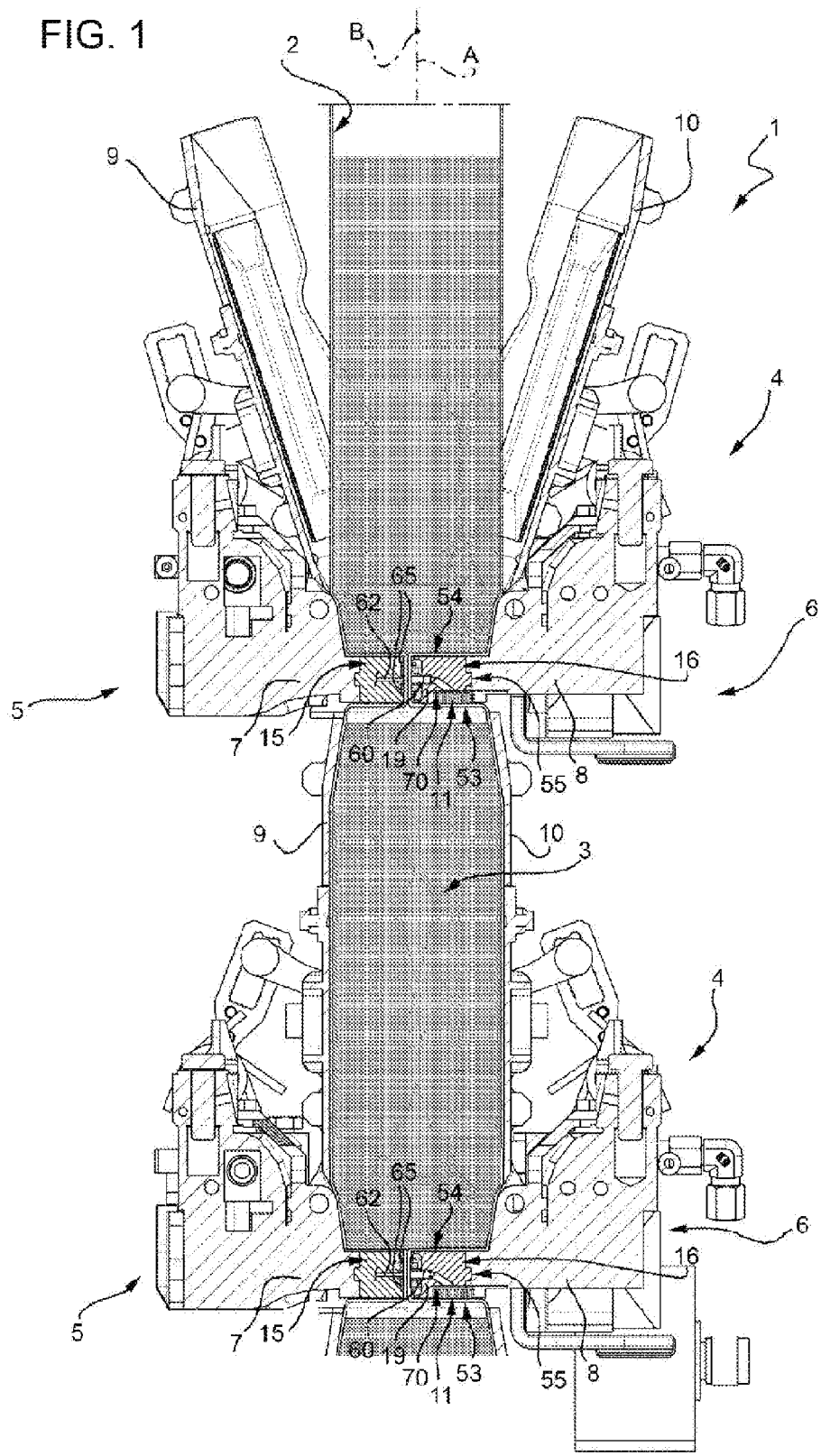
FIG. 1 shows a side view, with parts removed for clarity, of a packaging unit for producing aseptic sealed packages of pourable food products from a tube of packaging material fed along a vertical forming path.
Figure 2:
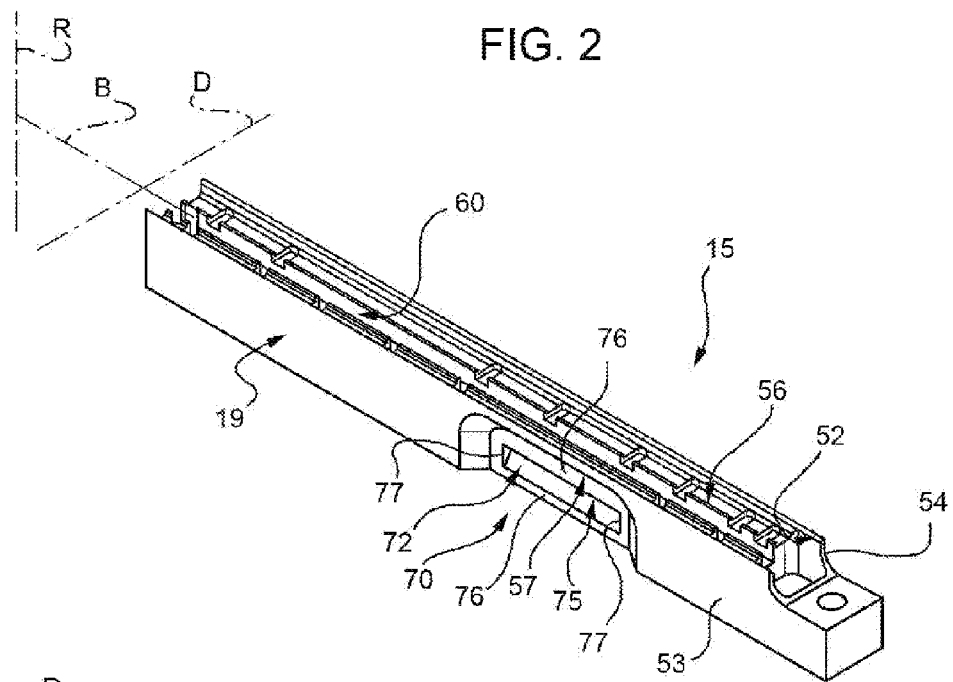
FIGS. 2 and 3 show perspective views, with parts removed for clarity, according to different visual angles of respective side opposite to one another of a sealing element according to the present invention and fitted to a respective sealing jaw of the unit of FIG. 1.
Figure 3:
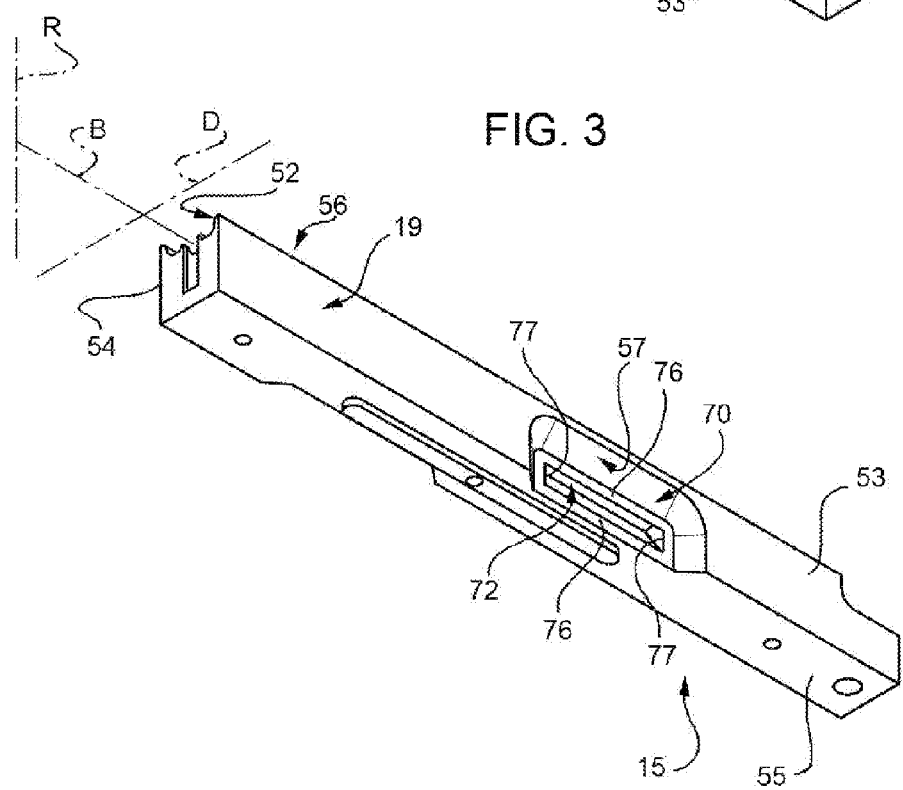

Number 1 in FIG. 1 indicates as a whole a packaging unit for producing sealed packages 3 (FIG. 1) of a food product from a tube 2 of sheet packaging material.

Unit 1 preferably produces sealed packages 3 of a pourable food product, such as pasteurized or UHT milk, fruit juice, wine, etc.

Unit 1 may also produce sealed packages 3 of a food product which is pourable into tube 2 when producing packages 3, and sets after packages 3 are sealed. One example of such a food product is a portion of cheese, which is melted when producing packages 3, and sets after packages 3 are sealed.

The packaging material has a multilayer structure (not shown) and comprises a layer of fibrous material, normally paper, covered on both sides with respective layers of heat-seal plastic material, e.g. polyethylene. In the case of aseptic packages for long-storage products, such as UHT milk, the packaging material also comprises a layer of gas- and light-barrier material, e.g. aluminium foil or ethyl vinyl alcohol (EVOH) film, which is superimposed on a layer of heat-seal plastic material, and is in turn covered with another layer of heat-seal plastic material forming the inner face of package 3 eventually contacting the food product.

Packaging material is also provided with a plurality of equally spaced opening devices 11 (FIG. 1) intended for allowing pouring of the pourable food product from formed package 3.

Tube 2 is formed in known manner by longitudinally folding and sealing a web (not shown) of heat-seal sheet material, is filled by a fill pipe (not shown) with the sterilized or sterile-processed food product for packaging, and is fed, in known manner not shown, along a vertical path indicated by an axis A in FIG. 1.

Unit 1 comprises two forming assemblies 4, which move vertically along respective rails (not shown) and interact cyclically and successively with tube 2 to grip it at equally spaced cross sections and perform induction heat-seal and cutting operations on tube 2.

Each forming assembly 4 substantially comprises a slide (not shown) which runs along the respective rail; and two jaws 5, 6 (only shown as necessary for a clear understanding of the present invention) hinged to the slide about respective horizontal axes, and movable between a closed position and a fully-open position.

In the example shown, jaws 5, 6 of each forming assembly 4 have respective arms 7, 8. Jaws 5, 6 extend parallel to a direction B perpendicular to direction A (FIG. 1), and are located on opposite sides of tube 2.

Each forming assembly 4 also comprises two facing forming shells 9, 10 hinged to respective jaws 5, 6 and movable between an open position (shown in FIG. 1 with reference to top forming assembly 4), into which they are pushed by elastic means, and a closed position (shown in FIG. 1 with reference to bottom forming assembly 4), in which they mate to form a space defining the shape and volume of package 3 to be formed in between.

Jaws 5, 6 of each forming assembly 4 also respectively comprise an induction sealing element 15 and a counter-sealing element 16 for respectively performing, on each cross section of tube 2 of packaging material gripped between relative jaws 5, 6, an induction heat-seal operation and a cutting operation along the centreline of the cross section.

With reference to FIGS. 2 to 5, each sealing element 15 comprises:
  a supporting body 19 connected by conventional fastening means to arm 7 of jaw 5 of relative forming assembly 4;
  two pairs of induction elements 20, 21 (shown in FIG. 5) housed in respective face seats in supporting body 19; and
  two inserts 31 (shown in FIG. 5) made of magnetic flux-concentrating material and fitted inside supporting body 19.

Alternatively, supporting body 19 may be formed integrally with arm 7 of jaw 5 of relative forming assembly 4.

Furthermore, inserts 31 and induction elements 20, 21 are fitted to the supporting body 19 through two pairs of injected plastic elements 90, 91.

With particular reference to FIG. 5, induction elements 20, 21 are defined by respective electrically conductive bars extending along direction B and arranged in pairs on opposite sides of a mid-plane R, parallel to direction B. Each plane R is orthogonal to direction A when respective jaws 5, 6 are in the closed position.

More specifically, induction elements 20 are symmetrical with respect to plane R and interposed between induction elements 21, which are also arranged symmetrically on opposite sides of plane R.

Induction elements 20, 21 interact with tube 2 of packaging material by means of respective preferably rectangular active surfaces 25, 26, which are elongated in direction B, extend in the same plane perpendicular to plane R, and have a width in a direction D and a length in direction B. Active surfaces 25, which are identical, are obviously interposed, in a direction D, between active surfaces 26, which are also identical and of the same length as active surfaces 25.

More precisely, direction D is orthogonal to direction B and coincides with direction A when jaws 5, 6 are in the closed position.

As shown in FIG. 5, respective projections 28, elongated in direction B, project from active surfaces 25 towards tube 2 of packaging material. Projections 28 may be continuous or segmented, extend along substantially the whole length of respective active surfaces 25, and provide, when heat sealing, for increasing the gripping pressure on tube 2.

Supporting body 19 extends symmetrically with respect to plane R and substantially comprises:

- two outer lateral parallel walls 53, 54 lying in respective planes parallel to plane R;
- an outer wall 55 connected to jaw 6 and extending perpendicularly to and between walls 53; and
- an outer wall 56 opposite to wall 55 and delimiting a cavity 52 which houses induction elements 20, 21 and insert 31.

In particular, induction elements 20, 21 cooperate, on the opposite side of active surfaces 25, 26, with wall 56. Furthermore, wall 56 cooperates with insert 31.

Each wall 53, 54 has a relative recess 57 (FIGS. 2, 3 and 5), which is adapted to be engaged by a respective opening device 11 pre-applied on the packaging material. In the embodiment shown, recess 57 is semicircular.

In particular, on the basis of the side of sealing element 15 with respect to direction A and in the normal operation of unit 1, one of recesses 57 is engaged by respective opening device 11.

More specifically, recesses 57 are offset with respect to each other.

Each sealing element 15 comprises a groove 60 (FIGS. 1, 4 and 5) and each counter-sealing element 16 comprises a cutting element 62 (FIG. 1).

More precisely, groove 60 extends parallel to direction B and symmetrically with respect to plane R.

Furthermore, groove 60 is defined by wall 56 and delimited, on the side of direction A, by an opening 61.

Cutting member 62 is flat, is housed in sliding manner inside a front seat on counter sealing element 16 of relative forming assembly 4, is movable along plane R, and is activated in known manner, not shown, by a hydraulic cylinder built into jaw 5.

Cutting member 62 is normally maintained in a withdrawn rest position, housed completely inside counter-sealing element 16, by known elastic means (not shown), and is moved by the relative hydraulic cylinder into a forward cutting position, in which it projects frontwards from jaw 5, engages groove 60 in sealing element 15 of relative jaw 6, and cuts along the centreline of the relative cross section of tube 2.

Preferably, cutting member 62 comprises a platelike base portion integral with the output member of the actuating hydraulic cylinder; and a cutter smaller in thickness, in direction A, than the base portion to ensure high cutting pressure and avoid damaging the packaging material.

Sealing element 15 also comprises two pressure pads (FIG. 1) made of heat-resistant elastomeric material, preferably nitrile rubber, and housed in respective front cavities of the same shape formed in jaw 5 of relative forming assembly 4 and located symmetrically on opposite sides of plane R. Pressure pads 65 of each counter sealing element 16 cooperate with active surfaces 25, 26 of induction elements 20, 21 of relative sealing element 15 to grip and heat seal tube 2 on opposite sides of plane R.

Advantageously, each sealing element 15 comprises a pair of slots 70 which extend between groove 60 and relative walls 53, 54 (FIG. 5).

In greater detail, each slot 70 extends between an end 80, opposite to opening 61, of relative groove 60 and a relative recess 57. Furthermore, slot 70 is tapered towards opening 61.

Each slot 70 comprises a portion 71 directly communicating with groove 60 and a portion 72 arranged between portion 71 and relative recess 57.

In the example shown in FIG. 5, portion 71 of each slot 70 has a length in direction B and a width in a direction D orthogonal to direction B and coincident with direction A when jaws 5, 6 are in the closed position.

Portion 72 of each slot 70 has a length in direction B and a width in a direction E sloped with respect to direction D.

Thickness of portions 71, 72 measured along respective directions D, E is constant.

Furthermore, the thickness of each portion 72 measured along direction E is higher than the thickness of relative portion 71 measured along direction D and lower than the maximum width of relative groove 60 measured along direction D.

Portion 72 further comprises, on its side opposite to portion 71, an end opening 75 defined by recess 57 and lying in a plane parallel to plane R.

More precisely, opening 75 is rectangular with two longer sides 76 parallel to direction B and two shorter sides 77 orthogonal to direction B.

In actual use, tube 2, filled with the pourable food product and provided with opening devices 11, is fed along direction A, and forming assemblies 4, operating a half-period out of phase, move up and down respective rails.

More specifically, as forming assemblies 4 move up and down, jaws 5, 6 move between the closed position (FIG. 1), in which they heat seal cross section of tube 2, and the open position, in which they are detached from tube 2.

As forming assemblies 4 operate, shells 9, 10 perform their work cycle. More precisely, shells 9, 10 are moved between the open position (shown in FIG. 1 with reference to top forming assembly 4) and the closed position (shown in FIG. 1 with reference to bottom forming assembly 4).

Once jaws 5, 6 are in the closed position and half-shells 9, 10 are closed about tube 2, packaging material arranged between induction elements 20, 21 of sealing element 15 and pads 65 of counter-sealing element 16 is heat-sealed to form a transversal sealing band of relative package 3.

In the normal operation of unit 1, the motion of the packaging material along direction A is perfectly synchronized with the motion of jaws 5, 6 between respective closed and open positions.

Therefore, once jaws 5, 6 of each forming assembly 4 are in the closed position and half-shells 9, 10 are closed about tube 2, a relative opening device 11 is arranged with its axis parallel to direction A and accommodated within respective recess 57 of sealing element 15 of jaw 5.

Cutting element 62 is held in the withdrawn rest position within the seat of relative counter-sealing element 16 during the heat sealing of cross section of tube 2.

Once each sealing element 15 has sealed a cross section of tube 2 and formed a transversal sealing band of relative package 3, cutting element 62 is moved to the forward cutting position.

As a consequence, cutting element 62 cuts along the centreline of the relative cross section of tube 2 separating formed package 3 from tube 2.

As it reaches the forward cutting position, cutting element 62 engages a relative groove 60.

In the starting cycles of unit 1, packaging material may be in the incorrect position with respect to jaws 5, 6, when cross sections of tube are heat sealed.

In other words, when each sealing element 15 heat-seals relative cross section of tube 2, the corresponding opening device 11 may be housed outside recess 57.

On the contrary, opening device 11 may remain along the trajectory of cutting element 62.

In this situation, cutting element 62 cuts away some residues of plastic material of opening device 11.

As cutting element 62 engages groove 60, such plastic residues are pushed outside supporting body 19 through slots 70. In particular, the aforementioned plastic residues accumulate on the outer surface of recesses 57 where they can be easily removed.

Accordingly, when packaging material is, in a second time, perfectly synchronized with the motion of jaws 5, 6 and opening devices 11 are accommodated one after the other within relative recess 57 during heat-sealing of cross section of tube 2, groove 60 is substantially free of plastic residues.

Any other possible residues of packaging material, e.g. paper mixed with polyethylene, that may remain within groove 60 is pushed outside supporting body 19 through one or both slots 70 and accumulate on the outer surface of one or both recesses 57 where they can be easily removed.

The advantages of sealing element 15 according to the present invention will be clear from the foregoing description.

In particular, by virtue of the presence of slots 70, the residues, e.g. of paper mixed with polyethylene, that could remain within groove 60 are easily pushed by cutting element 62 towards outer wall 53 of sealing element 15, where such residues can be easily removed.

Accordingly, cutting element 62 may freely slide within groove 60 without deforming sealing element 15.

As a consequence, the risks of damaging sealing element 15 and/or cutting element 62 are greatly reduced and the life-time of sealing element 15 is enhanced with respect to the solution described in the introductory part of the present description.

The presence of slots 70 is particularly advantageous in case that tube 2 is fitted with pre-applied opening device 11.

In fact, in such case, packaging material may be in the incorrect position with respect to jaws 5, 6, when cross sections of tube 2 are heat-sealed.

Accordingly, opening devices 11 instead of being housed within recesses 57 of relative sealing elements 15 may remain along the trajectory of cutting element 62 between withdrawn rest and forward cutting position and some residues of plastic material may be cut away by cutting element 62.

By virtue of the presence of slots 70, these plastic residues, instead of remaining within groove 60, are easily pushed by cutting element 62 towards outer wall 53 of the sealing element 15, where such residues can be easily removed.

As a consequence, even when packaging material has been in a second time automatically arranged in the correct position with respect to jaws 5, 6 and opening devices 11 are housed within relative recesses 57, groove 60 is substantially free of plastic residues.

Accordingly, also in this case, the risks of damaging sealing element 15 and/or cutting element 62 are greatly reduced and the life-time of sealing element 15 is enhanced with respect to the solution described in the introductory part of the present description.

Clearly, changes may be made to the sealing element 15 as described and illustrated herein without, however, departing from the scope of the present invention as defined in the accompanying Claims.

In particular, sealing element 15 may be fitted with different heating means, e.g. a sonotrode or a heated bar.

Furthermore, packaging unit may have no rails and slides, and comprise two chain conveyors provided with respective pluralities of jaws 5 and 6, defining a cavity into which tube 2 is fed, and moving along respective closed paths having respective linear portions facing one another.

Portion 71 of slots 70 may have different values of thickness measured along direction D. In particular, the thickness of portion 71 measured along direction D may be equal to the thickness of groove 60 measured along direction D.

Finally, supporting body 19 of sealing element 15 may comprise only one central slot 70.

The invention claimed is:

1. A sealing element for heat sealing packaging material for producing sealed packages of food products which are pourable within a tube of said packaging material;
    said sealing element comprising:
    heating means adapted to heat-seal said packaging material at spaced cross sections of said tube, so as to form a plurality of said sealed packages; and
    a groove which may be engaged by a cutting element carried by a counter sealing element during a cutting operation in which a sealed package is separated from said tube;
    comprising at least a slot which extends between said groove and a first outer wall of said sealing element.

2. Sealing element according to claim 1, wherein said first outer wall defines a recess which may be engaged by an opening device located on said packaging material during said cutting operation; said slot being arranged between said recess and said groove.

3. Sealing element according to claim 2, wherein said slot comprises:
    a first portion adjacent to and directly communicating with said groove; and
    a second portion arranged between said first portion and said recess, adjacent to and directly in communication with said first portion and said recess.

4. Sealing element according to claim 3, wherein the thickness of said second portion is lower than the thickness of said groove and greater than the thickness of said first portion.

5. Sealing element according to claim 3, wherein said groove and said slot have both a length along a second direction transversal to a first direction along which said tube extends.

6. Sealing element according to claim 5, wherein said second portion is sloped with respect to said first portion.

7. Sealing element according to claim 1, comprising a second outer wall which defines an outer opening of said groove and is adjacent and transversal to said first wall.

8. A packaging unit for producing sealed packages of a food product from a tube of packaging material fed in a first direction and filled continuously with said food product;
    said unit comprising:
    at least two pairs of jaws which act cyclically and successively on said tube to grip said tube at spaced cross sections;
    a sealing element and a counter-sealing element fitted respectively to a first and second jaw of each said pair and adapted to heat seal the packaging material at said spaced cross sections, so as to form a plurality of sealed packages;
    said counter sealing element comprising a cutting element adapted to interact with the packaging material for separating a formed package from said tube;
    wherein said sealing element is a sealing element as claimed in claim 1.

* * * * *